(No Model.)

W. SCHOTT.
TOY PUZZLE.

No. 499,333. Patented June 13, 1893.

Witnesses:
Raphael Netter
Robt. F. Gaylord

Inventor
William Schott
by Duncan & Page
Attorneys.

UNITED STATES PATENT OFFICE.

WILLIAM SCHOTT, OF BROOKLYN, NEW YORK.

TOY PUZZLE.

SPECIFICATION forming part of Letters Patent No. 499,333, dated June 13, 1893.

Application filed December 12, 1892. Serial No. 454,873. (No model.)

*To all whom it may concern:*

Be it known that I, WILLIAM SCHOTT, a citizen of the United States, residing at Brooklyn, in the county of Kings and State of New York, have invented a new and useful Toy Puzzle, of which the following is a specification, reference being had the drawings accompanying and forming a part of the same.

This invention consists of an egg-shaped piece, (which may hereinafter be called the egg) and a receptacle therefor provided with a hole in its bottom, these parts being of such relative construction and arrangement that the egg when placed at random in the receptacle can, by skillful manipulation and without touching it, be caused to assume an upright or vertical position with one of its ends inserted in the hole in the bottom of the receptacle, thus providing an amusing and interesting toy puzzle recalling the story of Columbus and the egg.

The invention is illustrated in the accompanying drawings, in which—

Figure 1:
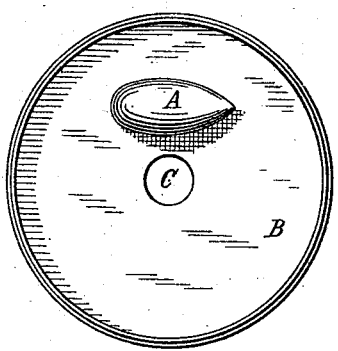
Figure 2:
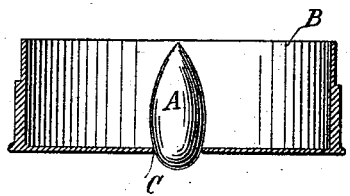

Figure 1 is a plan view of the egg lying in the receptacle; and Fig. 2 is a cross-section through Fig. 1, showing the egg in an upright position with its larger end inserted in the hole in the bottom of the receptacle.

In the drawings: A represents the egg, which is preferably ovoidal in shape, although it may be ellipsoidal. It is made of any suitable material, as wood, paper, clay or glass; cut, turned, molded or otherwise brought to the proper shape and size.

B is a receptacle for containing the egg and in which it is manipulated and brought to the upright position. It is preferably circular in shape with a flat bottom and may be of any suitable material, card-board being preferred by reason of its cheapness and lightness. In the bottom of the receptacle, and preferably at or near its center, is a hole C of a shape and size to permit one end of the egg to be inserted therein and to retain the egg in an upright position, as shown in Fig. 2 of the drawings. The size of the hole should bear the proper relation to the size of the egg; it should not be so small that it will be impossible to bring the egg into the upright position, nor so large as to make the solution of the puzzle too easy. The proportions of these parts, as shown in the drawings, will permit the solution of the puzzle and at the same time render it sufficiently difficult to make it interesting, until the operator has become familiar with the proper manipulation when it can be done easily and quickly.

One variety of manipulation by which the puzzle is readily solved consists in inclining the receptacle back and forth until the egg is brought into a position so that its larger end (if ovoidal in shape) dips slightly into the hole. Then by a succession of gentle taps applied to the bottom or sides, or both, of the receptacle the egg is gradually brought into an upright position, that is, with its longer axis at right angles to the bottom of the receptacle, and will be held in such position by the fit of the walls of the hole upon the contour of the egg.

What is claimed as new is—

A toy puzzle consisting of an egg-shaped part and a receptacle therefor provided with a hole in its bottom, these parts being constructed and arranged relatively to each other, whereby the egg-shaped part, under skillful manipulation and without being touched, can be brought to assume an upright position with one of its ends inserted in the hole in the bottom of the receptacle.

WILLIAM SCHOTT.

Witnesses:
ROBT. F. GAYLORD,
JAMES CATLOW.